United States Patent
Janssen

[11] Patent Number: 6,071,049
[45] Date of Patent: Jun. 6, 2000

[54] METHOD AND MACHINE FOR ROTARY MILLING THE CRANKPINS OF CRANKSHAFTS USING DISK MILLING CUTTERS

[75] Inventor: Josef Janssen, Moenchengladbach, Germany

[73] Assignee: Hegenscheidt-MFD GmbH, Erkelenz, Germany

[21] Appl. No.: 09/232,012

[22] Filed: Jan. 14, 1999

[30] Foreign Application Priority Data

Jan. 20, 1998 [DE] Germany ............................ 198 01 862

[51] Int. Cl.[7] ............................................................ B23C 1/30
[52] U.S. Cl. ........................... 409/132; 29/6.01; 82/1.11; 451/57
[58] Field of Search ...................... 409/132, 231, 409/139, 268, 200, 199; 29/6.01, 888.08; 82/1.11, 104, 106; 451/57, 65, 249, 163

[56] References Cited

U.S. PATENT DOCUMENTS

| 3,948,076 | 4/1976 | Eitel et al. ........................................ 29/6 |
| 4,090,422 | 5/1978 | Berbalk ........................................ 82/1.11 |
| 4,276,794 | 7/1981 | Berbalk ........................................ 82/104 |
| 4,309,134 | 1/1982 | Schmid ........................................ 409/231 |
| 4,444,533 | 4/1984 | Riley et al. ........................................ 409/132 |
| 4,505,071 | 3/1985 | Schwar ........................................ 451/65 |
| 4,790,698 | 12/1988 | Heffron ........................................ 409/200 |
| 5,025,689 | 6/1991 | Mayer ........................................ 82/106 |
| 5,078,556 | 1/1992 | Schrod et al. ........................................ 409/132 |
| 5,142,827 | 9/1992 | Phillips ........................................ 451/57 |
| 5,321,505 | 6/1994 | Misiak et al. ........................................ 418/55.1 |
| 5,408,745 | 4/1995 | Tomiyama et al. .................. 29/888.08 |
| 5,493,761 | 2/1996 | Bone ........................................ 29/6.01 |
| 5,722,878 | 3/1998 | Phillips ........................................ 451/163 |
| 5,725,339 | 3/1998 | Yoshita ........................................ 409/132 |
| 5,743,688 | 4/1998 | Kiefer et al. ........................................ 409/268 |
| 5,829,930 | 11/1998 | Shimomura ........................................ 409/134 |

FOREIGN PATENT DOCUMENTS

| 2836383 | 12/1979 | Germany ........................................ 409/200 |
| 2909227 | 10/1980 | Germany ........................................ 82/106 |
| 19546197 | 1/1997 | Germany . |
| 352055092 | 5/1977 | Japan ........................................ 451/249 |
| 59-715 | 4/1983 | Japan ........................................ 82/106 |
| 118301 | 7/1984 | Japan ........................................ 82/106 |
| 8904230 | 4/1987 | Japan ........................................ 409/199 |

*Primary Examiner*—Andrea L. Pitts
*Assistant Examiner*—Adesh Bhargava
*Attorney, Agent, or Firm*—W. F. Fasse; W. G. Fasse

[57] ABSTRACT

A crankshaft (6) is rotated about its axis (7), and all of its crankpins (28, 29, 30), which each respectively have an eccentricity (e) relative to the axis (7), are simultaneously rotary milled by respective allocated rotary milling cutters (34, 35, 36) of a milling cutter set (12). The individual milling cutters (34, 35, 36) each respectively have an eccentricity (e) corresponding to the eccentricity of the respective crankpin that is allocated to be machined by the respective milling cutter. Furthermore, the milling cutter set (12) is rotated at the same rotational speed, i.e. with a rotational speed ratio of 1:1, relative to the rotating crankshaft, while simultaneously the milling cutter set is moved in the X-direction toward the crank-shaft axis to achieve a feed advance. A rotary milling machine for carrying out the method includes a milling cutter set of which the milling cutters respectively have the same eccentricity as the respective allocated crankpins of the crankshaft to be milled, and includes a drive apparatus for achieving the 1:1 rotation of the milling cutter set relative to the crankshaft as well as the feed advance motion of the milling cutter set. In this manner, the milling cutters automatically follow the eccentricity of the crankpins, without requiring a complicated individual guidance.

22 Claims, 5 Drawing Sheets

METHOD AND MACHINE FOR ROTARY MILLING THE CRANKPINS OF CRANKSHAFTS USING DISK MILLING CUTTERS

PRIORITY CLAIM

This application is based on and claims the priority under 35 U.S.C. §119 of German Patent Application 198 01 862.2, filed on Jan. 20, 1998, the entire disclosure of which is incorporated herein by reference.

CROSS-REFERENCE TO RELATED APPLICATION

This application is related to my patent application entitled "METHOD AND MACHINE FOR ROTARY MILLING THE CRANKPINS AND MAIN BEARING PINS OF CRANKSHAFTS" filed on the same date as the present application.

FIELD OF THE INVENTION

The invention relates to a method for the rotary milling of the crankpins of crankshafts using disk milling cutters, whereby the crankshaft is held and rotated about its axis in the two chucks of a turning apparatus while the rotary milling is carried out. The invention further relates to a machine for carrying out such a method.

BACKGROUND INFORMATION

Various different methods and apparatus are known for carrying out the rotary milling of the crankpins of crankshafts, either one at a time or several simultaneously. German Patent 195 46 197 (Gesell) discloses a method and an apparatus of the above described general type, wherein at least two milling cutters simultaneously carry out rotary milling or machining on at least two crankpins of a rotating crankshaft, whereby the crankpins revolve around the axis of the rotating crankshaft. To achieve this, the German Patent 195 46 197 discloses a rather complicated guidance of the disk milling cutters to follow the eccentric revolution of the crankpins around the crankshaft axis as the crankshaft rotates. The reference further suggests that the rotation speed of the crankshaft is adapted or varied in view of the optimal milling operation of a rotational tool, and the rotational speed of the second and each further rotational tool is regulated dependent on the crankshaft rotational speed prescribed by such adaptation or variation. The equipment and method features necessary for carrying out the above mentioned guidance of the disk milling cutters to follow the motion of the crankpins is regarded as disadvantageously complicated and costly, and subject to breakdowns and improper operation.

SUMMARY OF THE INVENTION

In view of the above, it is an object of the invention to provide a method for the simultaneous rotary milling of a plurality and preferably all of the crankpins of a crankshaft, while avoiding the need for a complicated control and guidance of the disk milling cutters so as to follow the motion of the crankpins. It is a further object of the invention to provide a simplified machine for carrying out such a method. The invention also aims to avoid or overcome the other disadvantages of the prior art, and to achieve additional advantages, as apparent from the present description.

The above objects have been achieved according to the invention in a method for rotary milling several parts of a workpiece respectively having different eccentric characteristics, and particularly the crankpins of a crankshaft for example, using disk milling cutters. A plurality and preferably all of the crankpins of a crankshaft are respectively rotary milled by a corresponding number of disk milling cutters of a disk milling cutter set. Each disk milling cutter respectively used for milling a given crankpin has an eccentricity about an axis of the disk milling cutter set that corresponds to the eccentricity of the respective associated crankpin about the axis of the crankshaft. The entire disk milling cutter set is rotationally driven at the same rotational speed, i.e. in a rotational speed ratio of 1:1, relative to the rotational speed of the rotationally driven crankshaft, and is fed or advanced in the X-direction radially toward the rotational axis of the crankshaft.

A machine according to the invention for carrying out the above method comprises a machine bed, a turning apparatus mounted on the machine bed and adapted to hold and rotate a crankshaft about its axis, and a milling apparatus mounted on the machine bed and including a disk milling cutter set including a plurality of disk milling cutters respectively corresponding to or allocated to a plurality of crankpins of the crankshaft that are to be milled. Each respective disk milling cutter has the same eccentricity about the axis of the milling cutter set as the respective allocated crankpin has relative to the rotational axis of the crankshaft. The machine according to the invention further includes a drive apparatus for generating the rotational and feed advance motion of the disk milling cutter set relative to the crankshaft, such that the rotational speed ratio between the crankshaft and the disk milling cutter set is 1:1.

In the method and the machine of the invention, since the milling cutters of the milling cutter set each respectively have the same eccentricity about the axis of the milling cutter set as do the respective plural crankpins about the rotational axis of the crankshaft, and because the milling cutter set rotates at the same rotational speed as the crankshaft during the milling operation, the cutting teeth of the respective milling cutters automatically or directly follow the eccentric revolving motion of the respectively allocated crankpins that are being milled. In this manner, it becomes unnecessary to provide a specialized and complicated guidance mechanism for the milling cutter set, and particularly individual guidance means for separately guiding each individual milling cutter so as to match the particular motion of its respective allocated crankpin. Instead, the inventive arrangement merely needs to maintain the 1:1 ratio between the rotational speeds of the milling cutter set and the crankshaft, while also properly carrying out the feed advance of the milling cutter set toward the crankshaft.

In order to adjustably achieve the required eccentricity of each disk milling cutter of the milling cutter set, a preferred embodiment of the invention provides that each disk milling cutter has three elongated slotted holes arranged therein as follows. One of the slotted holes extends along an elongation direction that extends radially relative to the center of the respective milling cutter, while the other two slotted holes extend along elongation directions parallel to that of the first slotted hole. Furthermore, the three slotted holes are arranged at locations rotationally offset by substantially 120° from each other. With this arrangement, a shifting adjustment of the respective disk milling cutter along the elongation direction of the slotted holes achieves the required adjustable eccentricity of the milling cutter relative to the rotation axis of the cutter set.

BRIEF DESCRIPTION OF THE DRAWINGS

In order that the invention may be clearly understood, it will now be described in connection with an example embodiment, with reference to the accompanying drawings, wherein.

DETAILED DESCRIPTION OF PREFERRED EXAMPLE EMBODIMENTS AND OF THE BEST MODE OF THE INVENTION

Figure 9:
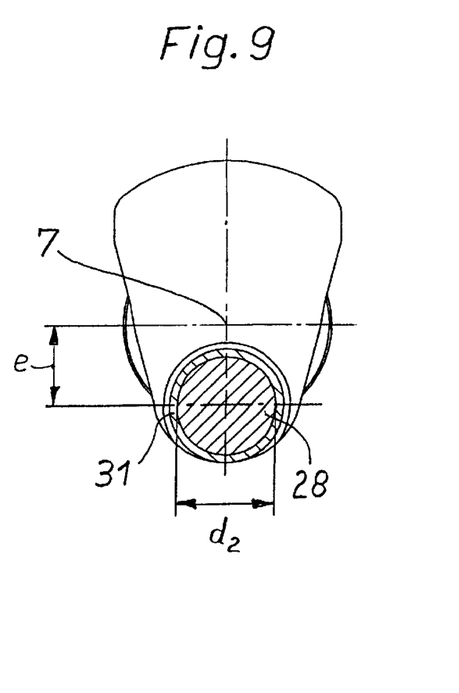
FIG. 9 shows a cross-section through the crankshaft taken along the section line IX—IX in FIG. 7.

In the present example, a crankshaft 6 that is to be precision rotary milled includes three crankpins or connecting rod bearing pins 28, 29 and 30 that are respectively rotationally offset by 120° from each other and that each have an eccentricity or radial offset e relative to the rotation axis 7 of the crankshaft 6. The crankshaft 6 has previously been cast or otherwise formed into its raw or semi-finished shape, in which each crankpin 28, 29 and 30 includes excess material in the form of a machining or milling allowance 31, 32 and 33 that is to be milled down in the rotary milling operation to a finished crankpin diameter $d_2$ (see FIGS. 7, 9). The crankshaft 6 further includes main bearing pins 62, 63, 64 and 65, which, in this example, have previously already been milled or otherwise machined to a finished diameter $d_1$.

Figure 1:
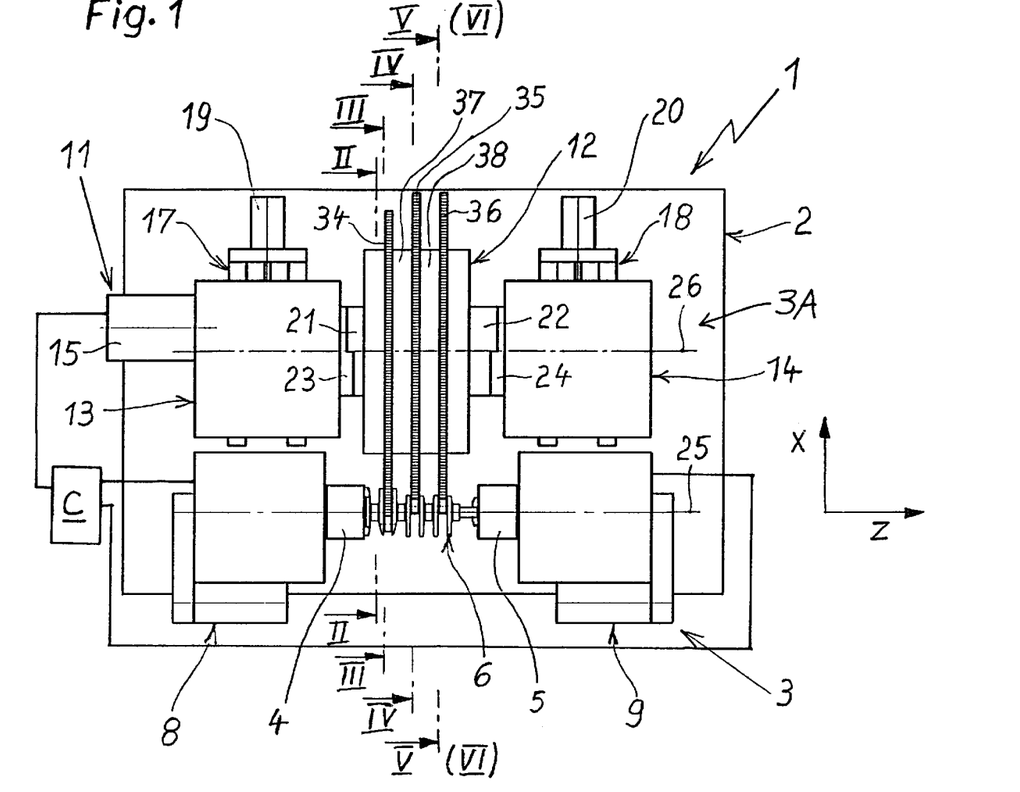
FIG. 1 is a general schematic plan view of an apparatus according to the invention including a rotary milling machine with a disk milling cutter set, as well as a turning apparatus holding a crankshaft that is to be milled by the milling cutters.

To carry out the milling operation, a rotary milling machine 1 according to the invention comprises a machine bed 2 and a turning apparatus 3 as well as a milling apparatus 3A arranged on the machine bed 2. The turning apparatus 3 includes two chucks 4 and respectively connected to and rotationally driven by two drive units 8 and 9, such as a respective driven head stock and tail stock. The crankshaft 6 is mounted in the two chucks 4 and 5 so that the crankshaft 6 can be rotated about its axis 7 by operation of the drive units 8 and 9.

In order to be able to receive the crankshaft 6 therebetween, and Ito be adjustably adaptable to the particular length 10 of the crankshaft, the two drive units 8 and 9 are mounted relative to the machine bed 2 in such a manner so as to be movably adjustable in the direction of the Z-axis, i.e. parallel to the rotation axis 25 of the two drive units, which coincides with the rotation axis 7 of the crankshaft 6. In order to ensure that the two chucks 4 and 5 rotate at the same speed with the same rotational force, and thereby to avoid any torsional loading of the crankshaft 6, an electrical synchronizing circuit or synchronous controller C is connected to synchronously drive the two drive units 8 and 9. For example, the two drive units respectively comprise separate electric drive motors, that are synchronously driven through the synchronous control circuit. Alternatively, the two drive units 8 and 9 may be mechanically coupled for a synchronous rotational drive.

The milling apparatus 3A includes a drive apparatus 11 arranged on the machine bed 2 generally next to the turning apparatus 3, as well as a disk milling cutter set 12 received between two spindle boxes 13 and 14. At least the first spindle box 13 is rotationally driven by a motor 15 so as to rotationally drive the disk milling cutter set 12 about its rotation axis 16, which coincides with the rotation axis 26 of the drive apparatus 11. The apparatus is so arranged that the axis 25 of the turning apparatus 3 (coinciding with the rotation axis 7 of the crankshaft 6) and the rotation axis 26 of the drive apparatus 11 (coinciding with the rotation axis 16 of the disk milling cutter set 12) are always parallel to each other lying in a plane 27 extending in the X- and Z-directions between the two axes 25 and 26.

The two spindle boxes 13 and 14 are respectively arranged as movable carriages on respective double rail guides 17 and 18, and are thus synchronously slidably movable along the guides 17 and 18 in the direction of the X-axis. This sliding movement of the spindle boxes 13 and 14 in a direction of the X-axis causes the milling cutter set 12 to move toward the crankshaft 6 in a feed advance motion. In order to synchronously slide the two spindle boxes 13 and 14 in this manner, and thereby achieve the feed advance motion of the milling cutter set 12, two synchronously operating motors 19 and 20 are respectively connected for driving the spindle boxes 13 and 14, for example through spindle shafts or the like. The feed advance motion can alternatively be achieved by moving the crankshaft toward the milling cutter set in the X-direction; i.e. it is the relative motion between the milling cutter set and the crankshaft in the X-direction that is significant.

The milling cutter set 12 includes two coupling halves or members 21 and 22 at opposite ends thereof, which respectively are coupled to mating coupling halves 23 and 24 connected to the spindle boxes 13 and 14. Thus, the rotational drive is transmitted from the spindle boxes 13 and 14 respectively through the coupling halves 23 and 24 to the coupling halves 21 and 22 of the milling cutter set 12. Between the two coupling halves 21 and 22, the milling cutter set 12 further comprises a plurality of (in this example three) circular milling cutters 34, 35 and 36 respectively provided with milling cutter teeth 34', 35' and 36' around the circular perimeters thereof. The three milling cutters 34, 35 and 36 may be identical to each other, for example having the same circular diameter $D_2$, but are respectively each arranged with a different eccentricity relative to the rotation axis 16 of the milling cutter set 12, so as to respectively match the eccentricities e of the crankpins 28, 29 and 30, as will be described in greater detail below.

In order to carry out the rotary milling operation, the crankshaft 6 is rotated about its axis 7 by the turning apparatus 3, while the milling cutter set 12 is rotated about its axis 16 and moved along the X-axis toward the crankshaft 6 to bring the three milling cutters 34, 35 and 36 respectively into contact with respective allocated ones of the crankpins 28, 29 and 30, and then to provide a milling feed advance as the milling progresses. Thereby, the excess material or machining allowance 31, 32 and 33 of the crankpins 28, 29 and 30 is milled down to the finished diameter $d_2$ (see FIG. 9).

In order to ensure that the milling cutter set 12 matches or follows the eccentricity of the respective crankpins of the crankshaft 6, each respective milling cutter 34, 35 and 36 is set or adjusted to have the same eccentricity e relative to the axis 16 of the milling cutter set 12, with the same relative rotational offset, as the corresponding associated crankpin 28, 29 and 30 has relative to the crankshaft axis 7. Furthermore, the entire milling cutter set 12 is rotated at the same rotational speed n as the crankshaft 6. This 1:1 rotational speed ratio between the crankshaft 6 and the milling cutters 34, 35 and 36, i.e. the milling cutter set 12, is achieved by a synchronous electrical control of the drive units 8 and 9 of the turning apparatus 3 as well as the motor 15 of the drive apparatus 11, through the synchronous controller C for example. Alternatively, this 1:1 rotational speed ratio could be achieved through a mechanical drive connection, such as a gear train or the like between the turning apparatus 3 and the milling apparatus 3A.

In addition to the three milling cutters 34, 35 and 36, as well as the two coupling halves 21 and 22, the milling cutter set 12 further comprises two intermediate spacer disks 37 and 38 respectively arranged between the milling cutters 34 and 35 and the milling cutters 35 and 36, as well as a mounting rod 39. This mounting rod 39 includes a centrally arranged shaft 39' and a key or spline 40 protruding radially therefrom. The coupling halves 21 and 22 as well as the intermediate spacer disks 37 and 38 are mounted on this shaft 39' and secured against rotation on the shaft 39' by the key or spline 40.

Each one of the milling cutters 34, 35 and 36 is respectively provided with a central bored hole 41, 42 and 43, having a diameter greater than the total resultant diameter of the shaft 39' of the mounting rod 39 with the key or spline 40 protruding therefrom. Therefore, the three milling cutters 34, 35 and 36 may be passed over the mounting rod 39 with free play, so as to remain loose and not fixed relative thereto. The milling cutters 34, 35 and 36 are secured to the mounting rod 39, or actually directly to the intermediate spacer disks 37 and 38 and the coupling halves 21 and 22, as will be described next.

Each milling cutter 34, 35 and 36 has three parallel extending elongated slotted holes 44, 45, 46, or 47, 48, 49, or 50, 51, 52 respectively, provided therein. In each one of the milling cutters 34, 35 and 36, a first one of the elongated slotted holes 44, 47, 50 extends in its elongation direction radially relative to the respective milling cutter center 53, 54 and 55. The two other elongated slotted holes 45 and 46 in the milling cutter 34, or 48 and 49 in the milling cutter 35, or 51 and 52 in the milling cutter 36, respectively extend in elongation directions parallel to the elongation of the first slotted hole 44, 47 or 50 respectively, and are arranged at locations that are rotationally offset substantially by 1200 from the first slotted hole 44, 47 or 50. This arrangement of the slotted holes can be best seen in FIGS. 3, 4 and 5.

Figure 2:
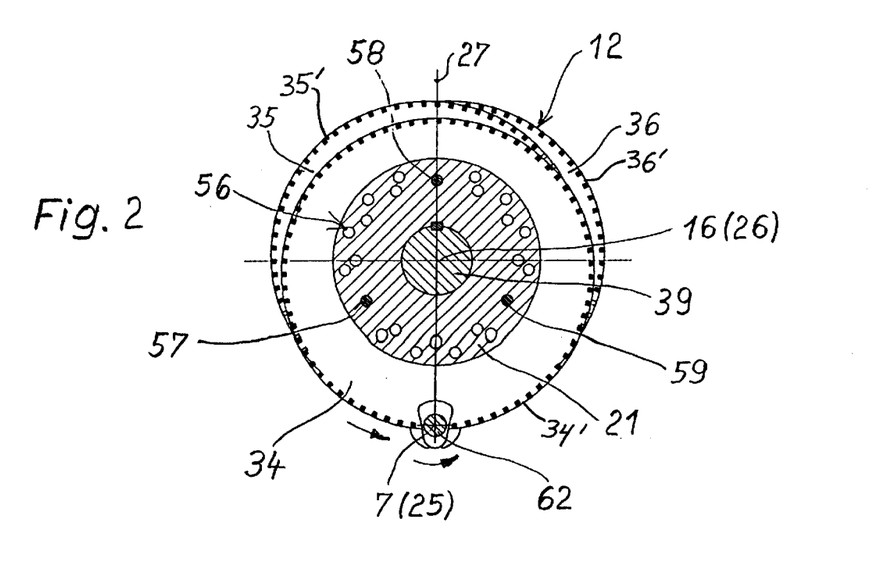
FIG. 2 is a sectional view through the milling cutter set and the crankshaft along the section line II—II shown in FIG. 1.

The coupling halves 21 and 22 as well as the intermediate spacer disks 37 and 38 each respectively have the same pattern of a plurality of holes 56 as shown especially in FIG. 2. Of this plurality of holes 56, three respective holes are brought into alignment or matching correspondence with the three elongated slotted holes 44 to 52 of each respective milling cutter 34, 35 and 36. The pattern of plural holes 56 is provided to allow for different adjustments of the milling cutters 34, 35 and 36, or even for the use of different milling cutters, to match different eccentric offsets of the crankpins of different crankshafts that may be machined using the apparatus.

Figure 6:
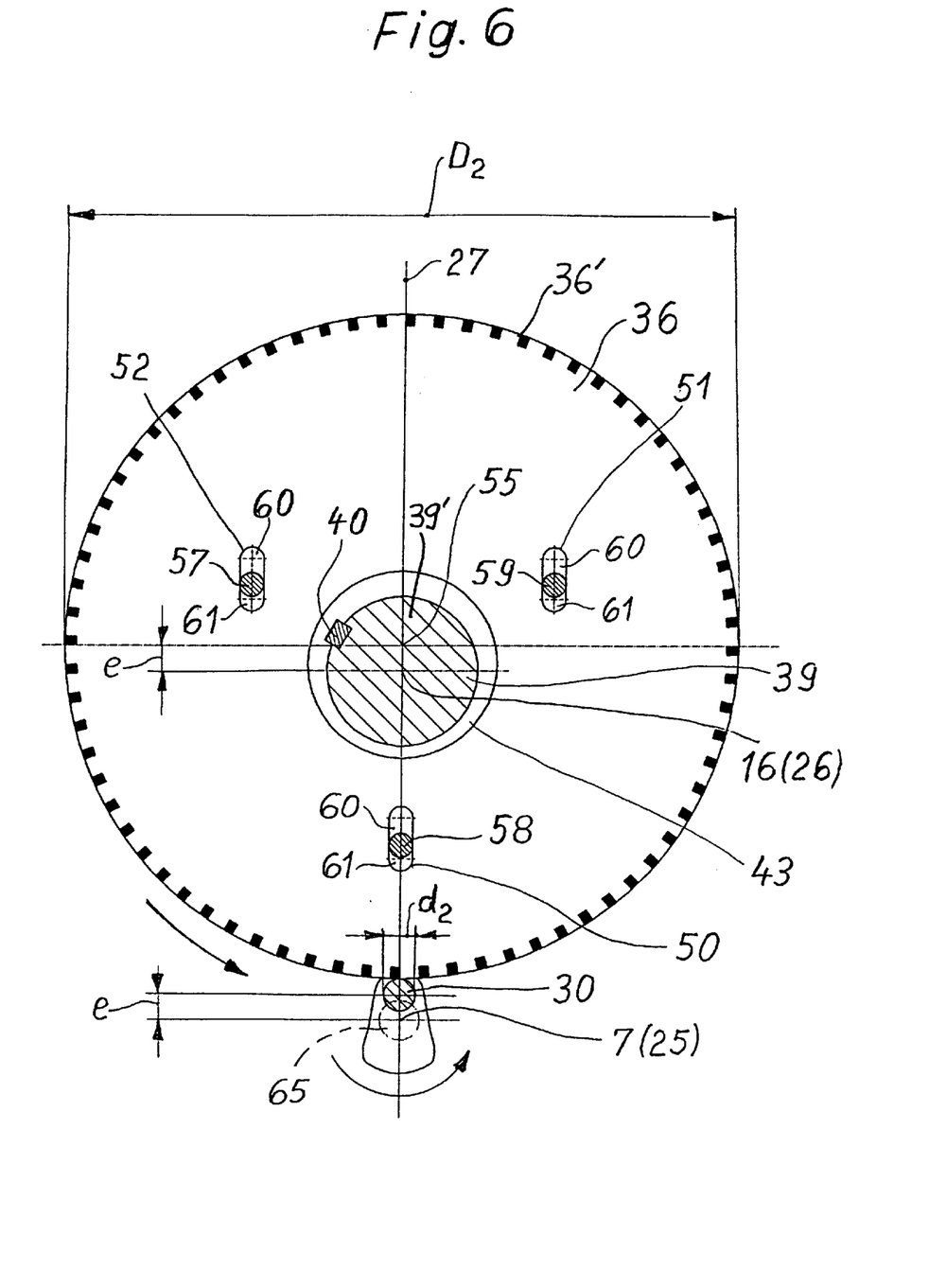
FIG. 6 is a sectional view through the milling cutter set and the crankshaft taken along the section line VI—VI in FIG. 1, on an enlarged scale and in a subsequent operating position in which the milling cutter set and the crankshaft have each respectively rotated 60° further relative to the position shown in FIG. 5.

The required eccentricity of the milling cutters 34, 35 and 36 in a particular case, i.e. for milling a particular crankshaft, is achieved by shifting each respective milling cutter along the direction of elongation of the slotted holes 44 to 52 to the required eccentric offset e of the milling cutter center 53, 54, 55 away from the rotation axis 16 of the milling cutter set 12 (see FIG. 6). Then the milling cutters 34, 35 and 36 are secured by inserting carrier bolts 57, 58 and 59 through the elongated slotted holes 44 to 52 and into or through the three respective holes of the hole pattern 56 in each of the intermediate spacer disks and the coupling halves that were brought into alignment with the slotted holes 44 to 52.

Figure 3:
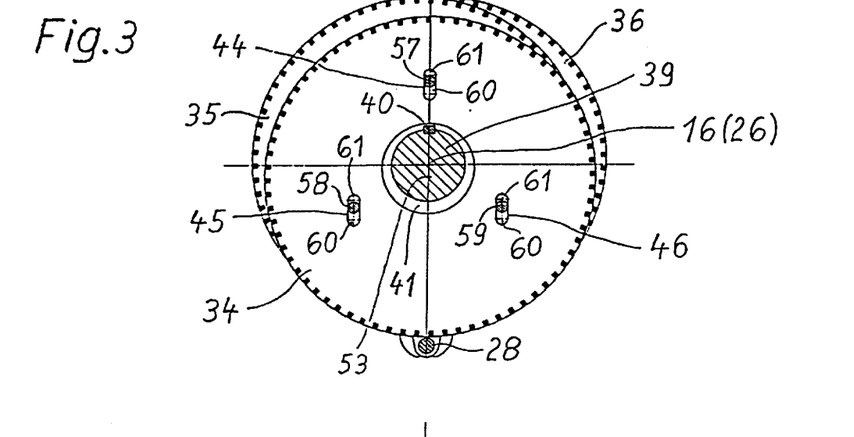
FIG. 3 is a sectional view through the milling cutter set and the crankshaft along the section line III—III shown in FIG. 1.
Figure 4:
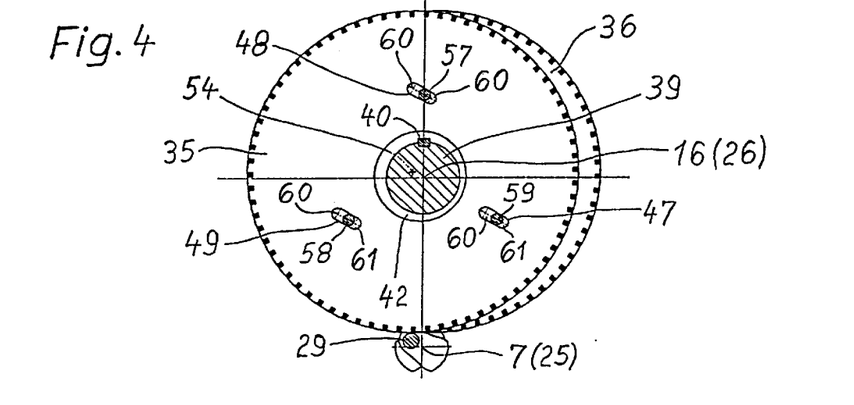
FIG. 4 is a sectional view through the milling cutter set and the crankshaft along the section line IV—IV shown in FIG. 1.
Figure 5:
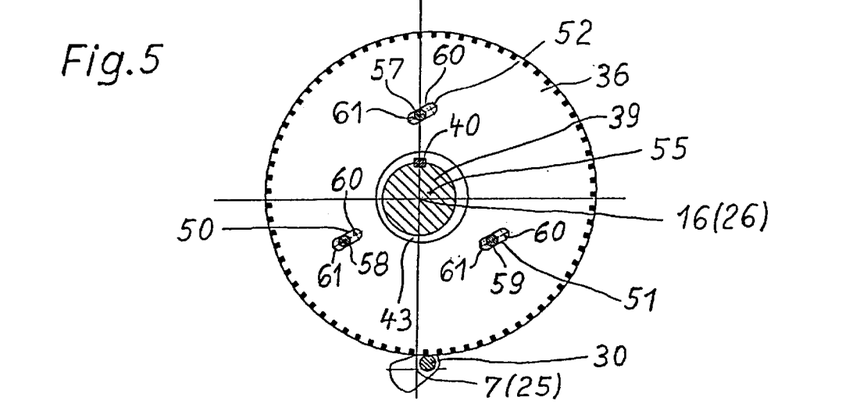
FIG. 5 is a sectional view through the milling cutter set and the crankshaft along the section line V—V shown in FIG. 1.

As is evident in FIGS. 3, 4 and 5, the eccentricity of each respective milling cutter 34, 35 and 36 is thereby fixed by tightening the bolts. Furthermore, to ensure that each respective milling cutter 34, 35 and 36 is secured with the proper eccentricity, filler pieces 60 and 61 are inserted into the respective elongated slotted holes 44 to 52 around the carrier bolts 57, 58 and 59, so that the cross-sectional portion of the carrier bolt together with the filler pieces 60 and 61 respectively fills out each elongated slotted hole 44 to 52 and thereby prevents the milling cutters from sliding or shifting out of the proper eccentric position. Once the filler pieces 60 and 61 are inserted and the bolts 57, 58 and 59 are tightened, they also serve to rotationally drive or carry the milling cutters 34, 35 and 36 along with the coupling halves 21 and 22 and the intermediate spacer disks 37 and 38, which are rotationally driven by the mounting rod 39 through the key or spline 40.

The rotary milling machine 1 is used to carry out the milling or machining of the crankpins 28, 29 and 30 by means of counter-milling, i.e. the milling cutter set 12 and the crankshaft 6 rotate in opposite or counter-directions (see e.g. FIG. 6), with the same rotational speed n. During the rotary milling operation, the motion of the milling cutters 34, 35 and 36 provides a first cutting speed component $v_{FPL}$ and the motion of the crankpins 28, 29 and 30 provides a second cutting speed component $v_{PL}$, whereby these two cutting speed components together give the overall resultant cutting speed $v_{RPL}$ of the cutting teeth relative to the surface of the crankpins being milled.

Figure 10:
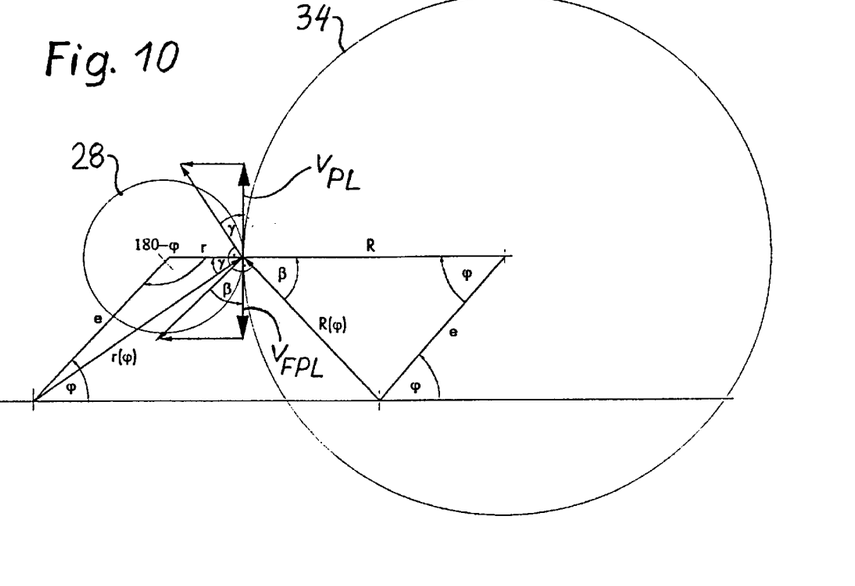
FIG. 10 is a geometric diagram illustrating the geometric relationships pertaining during the rotary milling of a crankpin of a crankshaft, as a basis for calculating the cutting speed components as well as the resultant cutting speed.

The geometric diagram shown in FIG. 10 illustrates the derivation of the following formulas that can be used for calculating the cutting speed components and the resultant cutting speed.

$$v_{FPL} = 2 \cdot \pi \cdot n \cdot R_{(\varphi)} \cos\beta$$

$$R_{(\varphi)} = \sqrt{e^2 - R^2 - 2 \cdot e \cdot R \cdot \cos\varphi}$$

$$\beta = \arccos\left(\frac{e^2 - R^2 - R_{(\varphi)}^2}{-2 \cdot R \cdot R_{(\varphi)}}\right)$$

-continued $$v_{PL} = 2 \cdot \pi \cdot n \cdot r_{(\varphi)} \cos \gamma$$

$$r_{(\varphi)} = \sqrt{e^2 + r^2 - 2 \cdot e \cdot R \cdot \cos(\pi - \varphi)}$$

$$\gamma = \arccos\left(\frac{e^2 - r^2 - r_{(\varphi)}^2}{-2 \cdot r \cdot r_{(\varphi)}}\right)$$

$$v_{RPL} = v_{FPL} + v_{PL}$$

Figure 11:
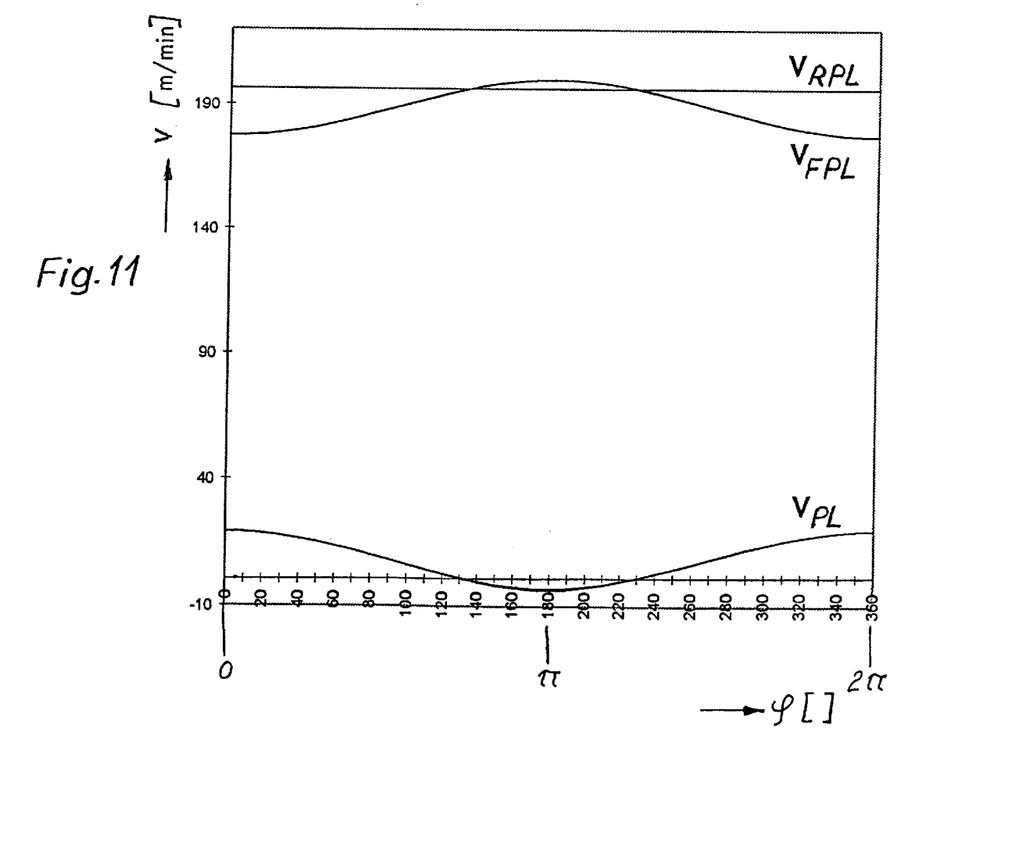
FIG. 11 is a cutting speed diagram representing the cutting speed components and the overall resultant cutting speed in a particular example machining process.

Next, the cutting speed diagram shown in FIG. 11 illustrates the cutting speed components and the resultant cutting speed over a rotational angular range of φ=0 to 2π, for the following machining process parameters:

D₂=1000 mm=diameter of each milling cutter 34, 35, 36 (D₂=2R);
d₂40 mm=diameter of each crankpin 28, 29 30 (d₂=2r);
e=30 mm=eccentricity of a crankpin 28, 29, 30;
n=60/min.=rotational speed of the crankshaft 6 and of the milling cutter set 12.

Using the above parameter values, it is possible to calculate the resultant cutting speed $v_{RPL}$ in the machining positions shown in FIGS. 6 and 3, as follows.

| | | | |
|---|---|---|---|
| $v_{FPL}$ | = $2 \cdot \pi \cdot n \cdot (R - e)$ | | |
| (φ = 0 or 2π) | = $2 \cdot \pi \cdot 60 \cdot (0.500 - 0.030)$ | = | 177.26 m/min. |
| $v_{PL}$ | = $2 \cdot \pi \cdot n \cdot (e + r)$ | | |
| (φ = 0 or 2π) | = $2 \cdot \pi \cdot 60 \cdot (0.030 + 0.020)$ | = | 18.85 m/min. |
| $v_{RPL}$ | = $v_{FPL}$ + $v_{PL}$ | = | 196.11 m/min. |
| (φ = 0 or 2π) | (φ = 0 or 2π) (φ = 0 or 2π) | | |
| $v_{FPL}$ | = $2 \cdot \pi \cdot n \cdot (R + e)$ | | |
| (φ = π) | = $2 \cdot \pi \cdot 60 \cdot (0.500 + 0.03)$ | = | 199.88 m/min. |
| $v_{PL}$ | = $-2 \cdot \pi \cdot n \cdot (e - r)$ | | |
| (φ = π) | = $-2 \cdot \pi \cdot 60 \cdot (0.030 - 0.020)$ | = | −3.77 m/min. |
| $v_{RPL}$ | = $v_{FPL}$ + $v_{PL}$ | = | 196.11 m/min. |
| (φ = π) | (φ = π) (φ = π) | | |

Thus, along the lines of the calculations above, also for the machining positions between φ=0 to π and φ=π to 2π, the resultant cutting speed $v_{RPL}$ is always constant at 196.11 m/min.

Figure 7:
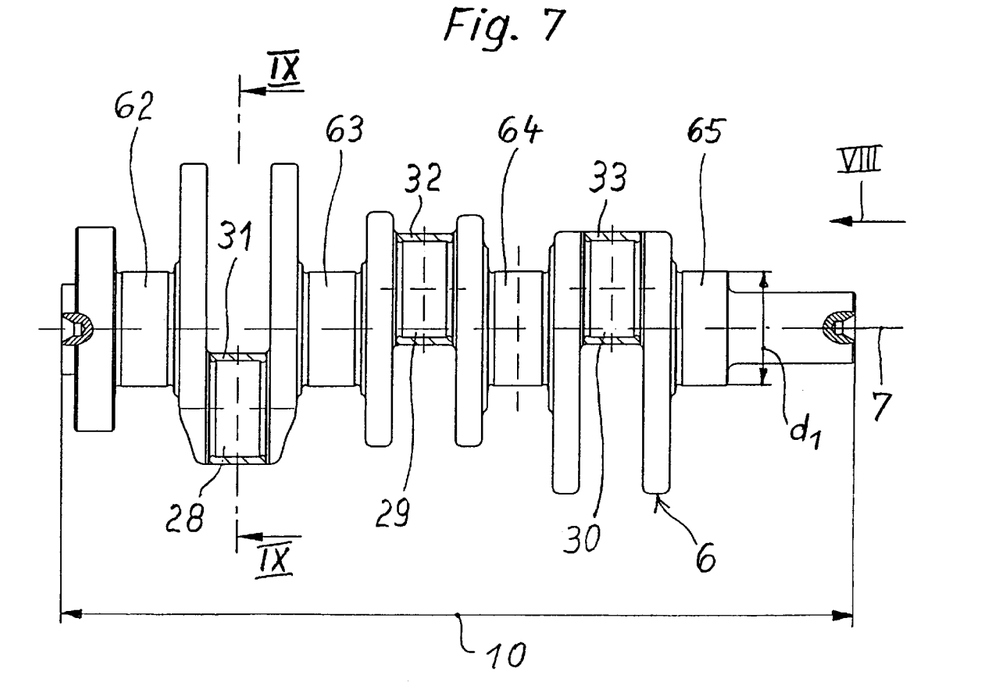
FIG. 7 is a partially sectioned side view on an enlarged scale, of the crankshaft that is to be received and machined in the inventive apparatus, showing the excess material or milling allowance provided on the crankpins.
Figure 8:
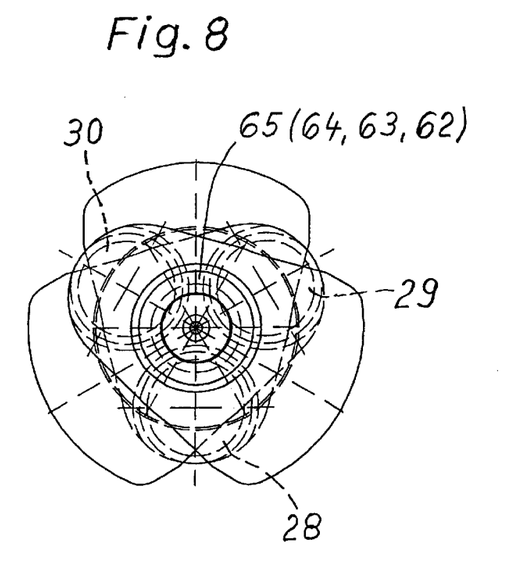
FIG. 8 is an end view of the crankshaft as seen in the direction of the arrow VIII in FIG. 7, showing the respective crankpins in dashed ghost lines behind the counterweight portions of the crankshaft.

At the beginning of the machining process, the resultant cutting speed $v_{RPL}$ is slightly higher due to the influence of the excess material in the form of the machining allowances 31, 32 and 33, which slightly increase the radius of the outer surfaces of the crankpins 28, 29 and 30 as shown in FIG. 7. For example, if a radial enlargement of 3 mm is taken into account for the machining allowances 31, 32 and 3.3, the resultant cutting speed $v_{RPL}$ is determined as 196.11+ (2·π·60·0.003)=196.11+1.13=197.24 m/min.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A method of rotary milling a plurality of parts of a workpiece, wherein said parts respectively have first eccentricities relative to a first rotation axis of said workpiece, said method comprising the following steps:

a) providing a milling cutter set comprising a plurality of milling cutters respectively allocated for milling respective ones of said parts of said workpiece, wherein said milling cutters respectively have second eccentricities relative to a second rotation axis of said milling cutter set, and wherein said second eccentricities of said milling cutters respectively correspond to said first eccentricities of said parts of said workpiece to which said milling cutters are respectively allocated;

b) rotating said workpiece about said first rotation axis at a first rotational speed;

c) rotating said milling cutter set about said second rotation axis at a second rotational speed matching said first rotational speed in a 1:1 ratio; and d) relatively moving said milling cutter set in a direction radially toward said workpiece so as to bring said milling cutters respectively into contact with respective allocated ones of said parts of said workpiece and to achieve a milling feed advance of said milling cutters relative to said workpiece.

2. The method according to claim 1, wherein said workpiece is a crankshaft, and said parts of said workpiece are crankpins of said crankshaft.

3. The method according to claim 2, wherein said plurality of parts includes all of said crankpins of said crankshaft, and further comprising carrying out said steps a), b), c) and d) so as to simultaneously mill all of said crankpins of said crankshaft.

4. The method according to claim 2, wherein said crankshaft further includes a plurality of main bearing pins arranged concentrically and without eccentricity relative to said first rotation axis, further comprising a prior operation of rotary milling said main bearing pins before carrying out said steps a), b), c) and d).

5. The method according to claim 2, wherein said crankshaft further includes non-eccentric parts in addition to said crankpins, and wherein said method involves milling only said crankpins and none of said non-eccentric parts of said crankshaft.

6. The method according to claim 1, wherein each one of said parts of said workpiece comprises a respective cylindrical surface that is to be milled, wherein each said cylindrical surface is offset relative to said first rotation axis by said respective first eccentricity, and wherein each one of said milling cutters comprises a respective circular disk milling cutter.

7. The method according to claim 1, wherein each one of said second eccentricities is respectively defined by a radial distance offset and by a rotational angle of a geometric center of a respective one of said milling cutters relative to said second rotation axis, and wherein said second eccentricities all comprise the same said radial distance offset and different ones of said rotational angle uniformly rotationally distributed around said second rotation axis.

8. The method according to claim 1, wherein said workpiece is rotated about said first rotation axis and said milling cutter set is rotated about said second rotation axis in respective opposite rotation directions.

9. The method according to claim 1, wherein said steps are carried out such that a resultant cutting speed of cutting tips of said milling cutters relative to a surface being milled of said parts of said workpiece remains constant during a complete rotation of said workpiece.

10. The method according to claim 1, wherein said step a) further comprises fixing together said milling cutters to prevent relative rotation therebetween, so that all of said milling cutters in said milling cutter set rotate in unison as a single unit in said step c).

11. A machine for rotary milling a plurality of parts of a workpiece, wherein said parts respectively have first eccentricities relative to a first rotation axis of said workpiece, said machine comprising:
- a turning apparatus adapted to receive and hold said workpiece and to rotate said workpiece about said first rotation axis at a first rotational speed;
- a milling apparatus comprising a milling cutter set, and a drive apparatus connected to said milling cutter set; and
- a synchronous speed controller connected to control said drive apparatus and said turning apparatus;
- wherein said milling cutter set comprises a plurality of milling cutters respectively allocated for milling respective ones of said parts of said workpiece, wherein said milling cutters respectively have second eccentricities relative to a second rotation axis of said milling cutter set, and wherein said second eccentricities of said milling cutters respectively correspond to said first eccentricities of said parts of said workpiece to which said milling cutters are respectively allocated;
- wherein said drive apparatus is connected to said milling cutter set so as to rotate said milling cutter set about said second rotation axis at a second rotational speed and to translationally move said milling cutter set relative to said turning apparatus in a direction extending radially relative to said first rotation axis of said workpiece; and
- wherein said synchronous speed controller is connected to said drive apparatus and to said turning apparatus and is adapted to control said drive apparatus and said turning apparatus to establish a 1:1 ratio between said first rotational speed and said second rotational speed.

12. The machine according to claim 11, wherein said drive apparatus comprises a spindle box, a first drive motor connected through said spindle box to said milling cutter set so as to rotationally drive said milling cutter set, and a second drive motor connected to said spindle box so as to translationally move said spindle box and said milling cutter set relative to said turning apparatus while keeping said second rotation axis parallel to said first rotation axis.

13. The machine according to claim 12, wherein said turning apparatus comprises two chucks adapted to receive opposite ends of said workpiece, and two motors that are driven synchronously with each other and that are respectively connected to said two chucks.

14. The machine according to claim 11, wherein said milling cutter set further comprises a mounting rod, coupling members arranged at opposite ends of said mounting rod, and a respective intermediate spacer disk interposed between each two adjacent ones of said milling cutters, wherein said coupling members are connected to said drive apparatus.

15. The machine according to claim 14, wherein said mounting rod includes a shaft and an interlocking key protruding radially outwardly from said shaft, each said spacer disk has a first hole therethrough fitting on said mounting rod with a notch in said hole receiving and engaging said key so as to fix said spacer disk against rotation on said mounting rod, and each said milling cutter has a second hole therethrough with a diameter a sufficiently large to pass said mounting rod including said key through said second hole with free play clearance.

16. The machine according to claim 14, wherein each said milling a cutter has therein three elongated slotted holes, which respectively extend in mutually parallel elongation directions, and which include a first slotted hole of which said elongation direction extends radially relative to a geometric center of said milling cutter and two further slotted holes arranged at locations rotationally spaced respectively by 120° relative to said first slotted hole.

17. The machine according to claim 16, wherein each one of said coupling members as well as each said intermediate spacer disk respectively has a same pattern of a plurality of mounting holes therein, including three mounting holes that are respectively in alignment through each said coupling member and each said spacer disk, and that are respectively in overlapping alignment with said three elongated slotted holes of each said milling cutter.

18. The machine according to claim 17, wherein said second eccentricities are determined for a respective one of said milling cutters by a sliding position of said respective milling cutter along said mutually parallel elongation directions of said slotted holes in variable overlapping alignment with said three mounting holes, and with said geometric center of said respective milling cutter eccentrically offset from said second rotation axis of said milling cutter set.

19. The machine according to claim 17, further comprising three carrier bolts extending through said three elongated slotted holes of said milling cutters and through said three mounting holes of each said coupling member and each said intermediate spacer disk, so as to interconnect said milling cutters, each said spacer disk, and said coupling members.

20. The machine according to claim 19, further comprising two filler pieces respectively inserted into each said elongated slotted hole of each said milling cutter together with and adjacent to a respective one of said carrier bolts.

21. The machine according to claim 17, wherein said pattern of a plurality of mounting holes includes more holes than said three mounting holes.

22. The machine according to claim 11, wherein each of said milling cutters is identical to the others of said milling cutters.

* * * * *

UNITED STATES PATENT AND TRADEMARK OFFICE
CERTIFICATE OF CORRECTION

PATENT NO. : 6,071,049
DATED : June 6, 2000
INVENTOR(S) : Janssen

It is certified that error appears in the above-identified patent and that said Letters Patent is hereby corrected as shown below:

Column 3,
Line 65, before "respectively", insert -- 5 --;

Column 4,
Line 5, after "and", replace "Ito" by -- to --;

Column 5,
Line 65, after "by", replace "1200" by -- 120° --;

Column 7,
Margin lines 1 to 5, replace the first and second equations to read:

$$v_{PL} = 2 \cdot \pi \cdot n \cdot r_{(\varphi)} \cdot \cos \gamma$$

$$r_{(\varphi)} = \sqrt{e^2 + r^2 - 2 \cdot e \cdot r \cdot \cos(\pi - \varphi)}$$

Line 53, after "and", replace "3.3" by -- 33 --;

Signed and Sealed this

Eleventh Day of June, 2002

Attest:

Attesting Officer

JAMES E. ROGAN
Director of the United States Patent and Trademark Office